United States Patent
Sultanxodjaev et al.

(10) Patent No.: US 10,939,693 B2
(45) Date of Patent: Mar. 9, 2021

(54) METHOD FOR PRODUCING FEED FROM SECONDARY RESOURCES FROM THE RICE PROCESSING INDUSTRY

(71) Applicants: Amanulla Asadullaevich Sultanxodjaev, Tashkent (UZ); Abror Abduraxmanovich Dadaxodjaev, Tashkent (UZ)

(72) Inventors: Amanulla Asadullaevich Sultanxodjaev, Tashkent (UZ); Abror Abduraxmanovich Dadaxodjaev, Tashkent (UZ)

( * ) Notice: Subject to any disclaimer, the term of this patent is extended or adjusted under 35 U.S.C. 154(b) by 0 days.

(21) Appl. No.: 16/490,817

(22) PCT Filed: Apr. 5, 2018

(86) PCT No.: PCT/UZ2018/000001
§ 371 (c)(1),
(2) Date: Sep. 3, 2019

(87) PCT Pub. No.: WO2018/209364
PCT Pub. Date: Nov. 15, 2018

(65) Prior Publication Data
US 2020/0000123 A1  Jan. 2, 2020

(30) Foreign Application Priority Data

May 11, 2017 (UZ) .................................. 20170176

(51) Int. Cl.
*A23K 10/12* (2016.01)
*A23K 50/10* (2016.01)
*A23K 10/30* (2016.01)

(52) U.S. Cl.
CPC .............. *A23K 50/10* (2016.05); *A23K 10/12* (2016.05); *A23K 10/30* (2016.05)

(58) Field of Classification Search
CPC ........ A23K 50/10; A23K 10/12; A23K 10/30; C12R 1/885; Y10S 435/945; F26B 2200/02; Y02P 60/87; A01N 25/00; A01N 63/10; A01N 63/30; A01N 65/00; A01N 43/56; A01N 43/40; A01N 2300/00; A01N 43/653; G01N 33/5097; G01N 33/0098; G01N 2333/726; C12N 15/8222; C12N 15/113; C12N 15/8216; C12N 15/8213; C07C 229/26; C07C 243/14; A61K 31/7105; A61K 31/713; A61K 47/16; A61K 47/22; A61K 9/1617; A61K 9/5015; A61K 9/51; A61K 38/00; C07D 213/77; C07D 231/08; C07D 233/52; C07D 295/30; C12Y 302/01004; C12Y 302/01

USPC ........................................................ 424/442
See application file for complete search history.

(56) References Cited

U.S. PATENT DOCUMENTS

| | | | | |
|---|---|---|---|---|
| 2010/0248320 A1* | 9/2010 | Lyons | ...................... | C12N 1/14 435/165 |
| 2013/0052682 A1* | 2/2013 | Medoff | .................. | C08B 1/003 435/68.1 |
| 2013/0330797 A1* | 12/2013 | Olsen | ..................... | C12P 5/023 435/167 |

FOREIGN PATENT DOCUMENTS

KR  101143902 B1 * 5/2012  ............... A23K 1/10
SU  704588 A1 * 12/1979

* cited by examiner

*Primary Examiner* — Satyendra K Singh
(74) *Attorney, Agent, or Firm* — Thomas M. Galgano; Galgano IP Law PLLC

(57) ABSTRACT

A method of manufacturing forage material includes crushing a mass of rice peeling and hulling bran into a powder with a grain size of 0.2 to 0.5 mm, hydrothermally processing the rice peeling and hulling bran powder for 1.5 to 2.0 hours at a temperature of between 110 and 120° C., and a pressure of 1 to 2 atmospheres, adding a culture of *Trichoderma lignorum* 19 in an effective amount proportional to the weight of the rice peelings, hulls and bran mass and maintaining same in an airtight hopper for 24-48 hours to effect a microbial process of saturation and accumulation of protein mass, and thereafter drying at a temperature of 50 to 60° C. until the moisture content is 13 to 14.5 percent.

5 Claims, No Drawings

METHOD FOR PRODUCING FEED FROM SECONDARY RESOURCES FROM THE RICE PROCESSING INDUSTRY

CROSS-REFERENCE TO RELATED APPLICATIONS

This application is a U.S. § 371 application of PCT application No. PCT/UZ2018/000001 filed Apr. 5, 2018, which claims the benefit of priority of Uzbekistan patent application No. IAP20170176(UZ) filed May 11, 2017.

BACKGROUND OF THE INVENTION

Field of the Invention

The invention is made in the field of the agriculture, in particular, for production of forages of non-fodder raw materials, namely, the waste products of the rice processing industry.

Description of Related Art

The method of production of a forage of vegetable origin by processing with fermented biomass ("Trichodermia Lignorum 19") under the patent 704588 ("Method of forages manufactures", issued to in the name of the Institute of Microbiology of the AS of the UzSSR, published in the Bulletin 47 on 25.12.79) is well-known. But a shortcoming of this well-known method is economic inexpedience of application thereof and insufficient nutrient value for bovine cattle.

Moreover, the cases of use of a waste of the rice processing industry for the fodder purposes are well-known. But in this regard, the process of their use as additives takes place.

Rice is one of the most valuable food products in the world. In the course of processing of rice grain, considerable quantity of rice peeling, which is undecayable due to presence of silicon dioxide, that is why, in most cases, it is burnt. The huge land areas are required for its dumping. Disposal of the waste product of the rice processing industry is the crucial engineering task. In this connection, disposal of the rice peeling has become the crucial risk also for Uzbekistan, in connection with rice cultivation and processing.

BRIEF SUMMARY OF THE INVENTION

The purpose of this invention is expansion of the raw-material base for manufacture of forages for animal husbandry, namely, bovine cattle (hereinafter referred to as the bovine cattle), and production of a nutritious forage of secondary raw materials, produced by the rice processing industry, which were not used for these purposes in the past, which can be applied as a high-grade forage, as well as in the form of a new component for manufacture of mixed fodder for bovine cattle.

DETAILED DESCRIPTION OF THE INVENTION

The task in view is solved in a way of use, according to the invention, of rice peeling and hulling bran as a basic vegetative component in the method of manufacture of forages of the waste products of the rice processing industry, which includes crushing and biofermented processing of vegetative component with active culture of *Trichoderma lignorum* 19, which is crushed into powder with grain size of 0.2-0.5 mm, then, the hydrothermal processing is carried out at the temperature of 110-120° C. till humidification up to 50-60% under the pressure of 1-2 atm. During 1.5-2 hours, then biofermented mass ("*Trichoderma lignorum* 19") in the quantity of 5-15% of the weight of the processed raw is added in the vegetation component, then the mix is placed in and sealed in an airtight hopper for carrying out a microbiological process of saturation and accumulation of protein mass for 24-48 hours, then, the received biomass is dried at a temperature of 50-60° C. till the moisture contents is 13-14.5%. Further, it is batch packed for further application as the finished product.

By practical consideration, the authors established that quantitative content of protein in the received product is similar to wheat properties, and it can be used as a component for manufacture of various kinds of mixed fodders instead. Thanks to that the bovine cattle has belly and reticulum, they fully consume and digests this kind of a forage that allows to satisfy a need of bovine cattle in energy to ensure gain up to 30% at the average.

The finished product can be used as forage for bovine cattle up to 30% in a daily allowance and as a new component at manufacture of mixed fodders for bovine cattle that appears most expedient and economically sound from the point of view of this product nutrient value.

Advantage of this method is the following: this invention allows disposal of secondary raw materials, produced by the rice processing industry, as well as to receive a forage for farm animals, namely, for bovine cattle as a main kind of a forage, which has greater nutrient value due to greater contents of a digested protein.

The specified method is realized as follows:

Example 1

For forage preparation in the weight of 1000 kg. a rice peeling (as appropriate, with addition of rice hulling bran) in the quantity of 950 kg. is crushed in the crusher into powder with grain size of 0.2-0.5 mm. The received mix is hydrothermally processed in the mixer with use of the steam boiler, at the temperature of 110-120° C. till humidifying up to 50-60% under the pressure of 1-2 atm. within 1.5-2 hours. Then, the biofermented mass is treated with 50 kg. of *Trichoderma lignorum* 19 ("*Trichoderma lignorum* 19"). As appropriate, the grape and apple pomace and wastes of the sugar manufacture are added. Further, it is mixed and fed to an airtight hopper, wherein for a period of 24-48 hours, the microbiological process of saturation and accumulation of protein mass is carried out. Then, the received resultant biomass is dried in a temperature range of 50-60° C. till the moisture content is 13-14.5%, and then it is batch packed in bags.

The socially useful effect of use of the invention consists in disposal of secondary raw materials, produced by the rice processing industry, and manufacture of a forage for farm animals with favourable outcomes, i.e. in more complete and rational use of the valuable, renewable vegetation product—rice peeling.

What is claimed is:
1. A method of manufacturing forage material, comprising the following steps:
   A. Crushing a mass of rice peelings into a powder having a grain size range of between about 0.2 to about 0.5 mm;

B. Subjecting the powder obtained from step A to a hydrothermal processing for 1.5-2 hours at a temperature of 100-120° C. to reach a humidity level of 50-60% at 1-2 atm. of pressure;

C. Mixing to the product obtained from step B, an active culture of *Trichoderma lignorum* 19 in the quantity of 5-15% of the weight of the processed powder obtained from step B;

D. Sealing the resultant mixture obtained from step C in an airtight hopper for 24-48 hours for effecting a microbial fermentation process for saturation and accumulation of protein mass; and E. Removing the product of step D from said airtight hopper and drying it at a temperature of 50 to 60° C. until a moisture content in the range of 13 to 14.5% is obtained.

2. The method of claim 1, wherein the hydrothermal processing in step B is performed in a steam boiler.

3. The method of claim 1, further comprising adding grape pomace, apple pomace and sugar production waste in step C.

4. The method of claim 1, wherein said mass of rice peelings in step A comprises rice hulls and rice bran.

5. The method of claim 4, wherein said mass of rice peelings consists essentially of rice hulls and rice bran.

* * * * *